Aug. 19, 1958 W. E. MARTIN 2,848,252
SEPARABLE COMPOSITE TRAILER CONSTRUCTION
Original Filed Oct. 9, 1946 5 Sheets-Sheet 1
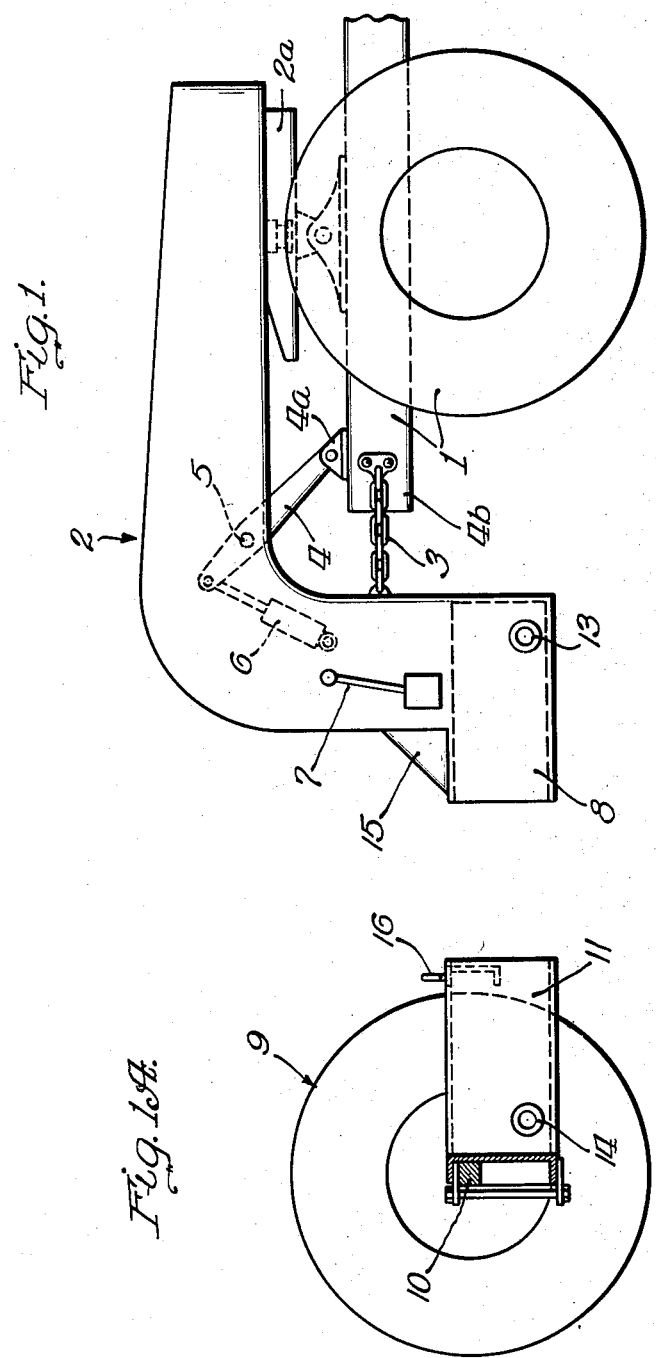
INVENTOR.
William E. Martin
BY
Eberhard E. Whatley
Atty.

Aug. 19, 1958  W. E. MARTIN  2,848,252
SEPARABLE COMPOSITE TRAILER CONSTRUCTION
Original Filed Oct. 9, 1946  5 Sheets-Sheet 2
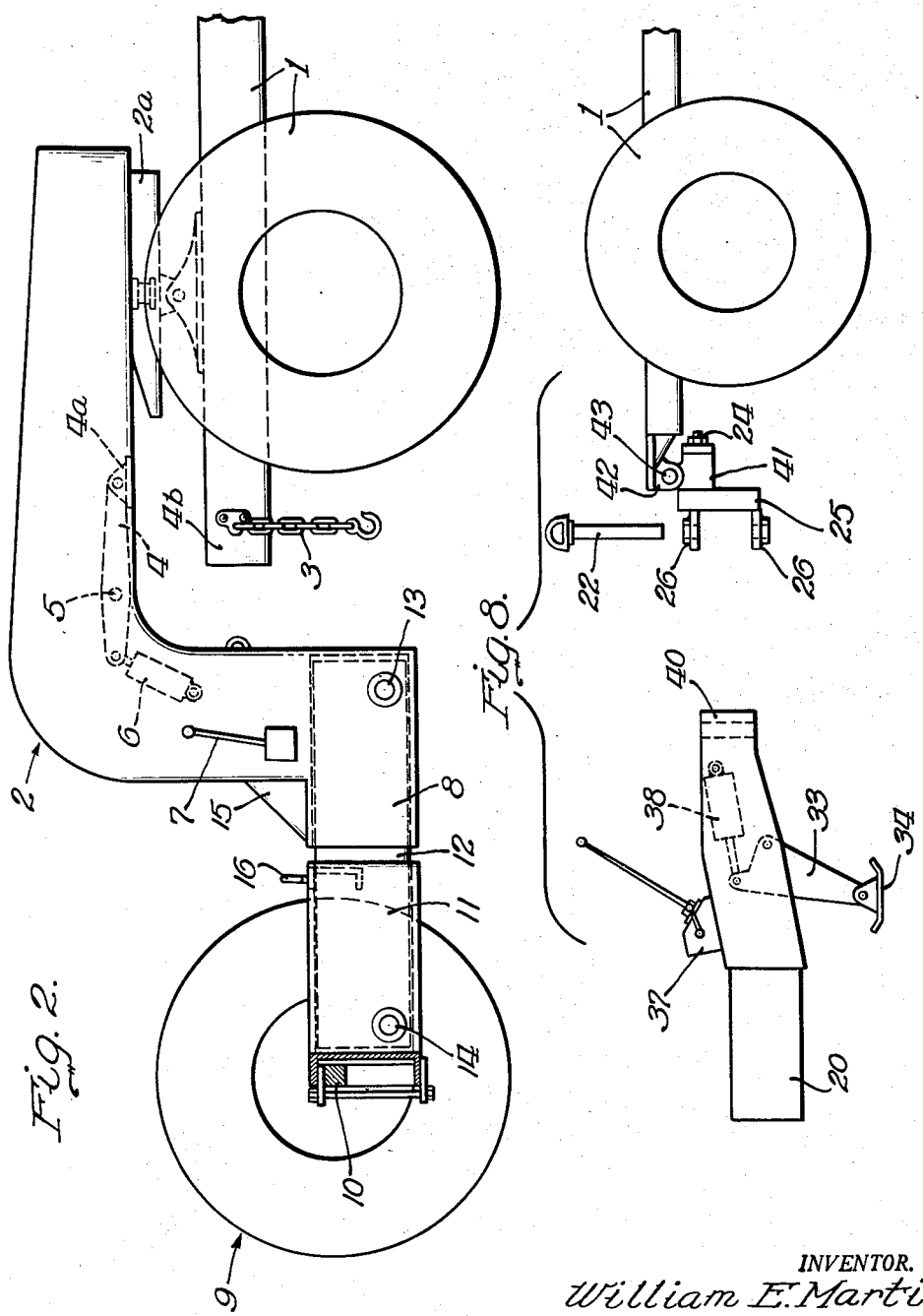
INVENTOR.
William E. Martin
BY
Eberhard E. Wetter
Atty.

Aug. 19, 1958 W. E. MARTIN 2,848,252
SEPARABLE COMPOSITE TRAILER CONSTRUCTION
Original Filed Oct. 9, 1946 5 Sheets-Sheet 3
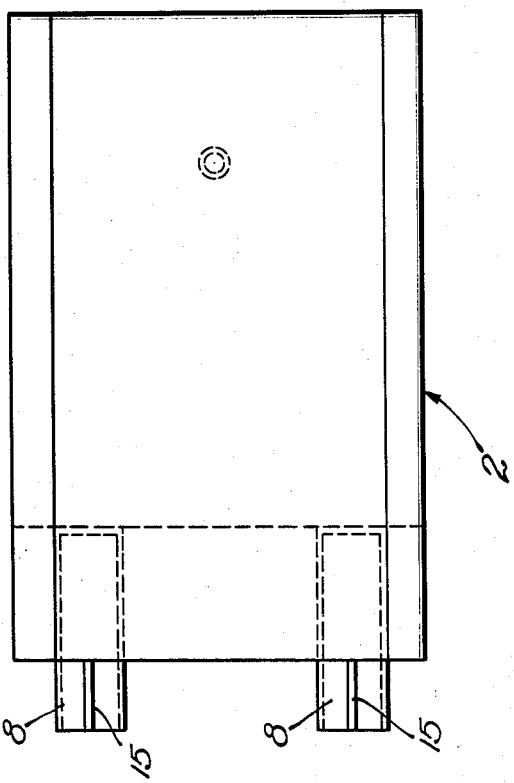
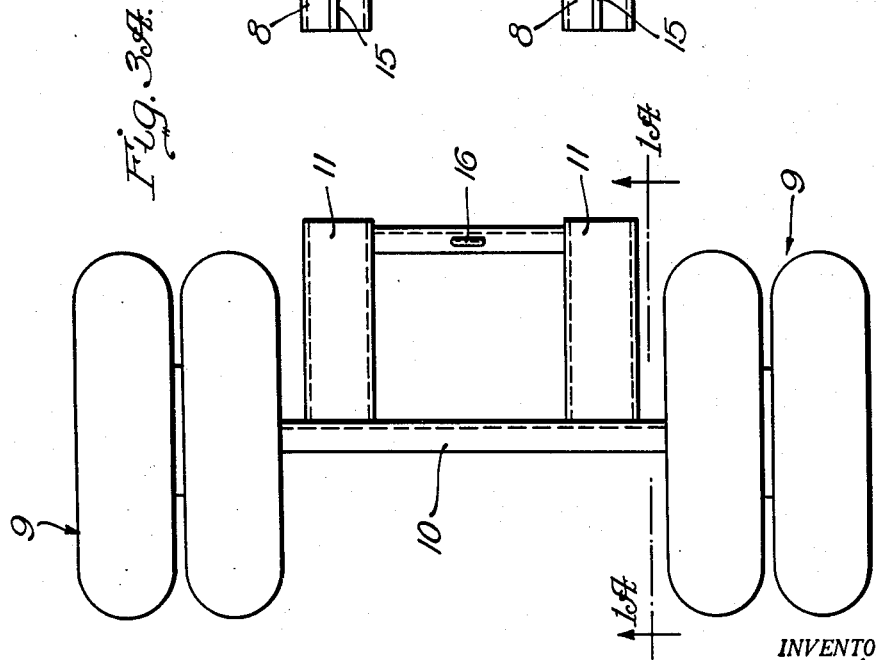
INVENTOR.
William E. Martin
BY
Eberhard E. Whittey
Atty.

Aug. 19, 1958 W. E. MARTIN 2,848,252
SEPARABLE COMPOSITE TRAILER CONSTRUCTION
Original Filed Oct. 9, 1946 5 Sheets-Sheet 4
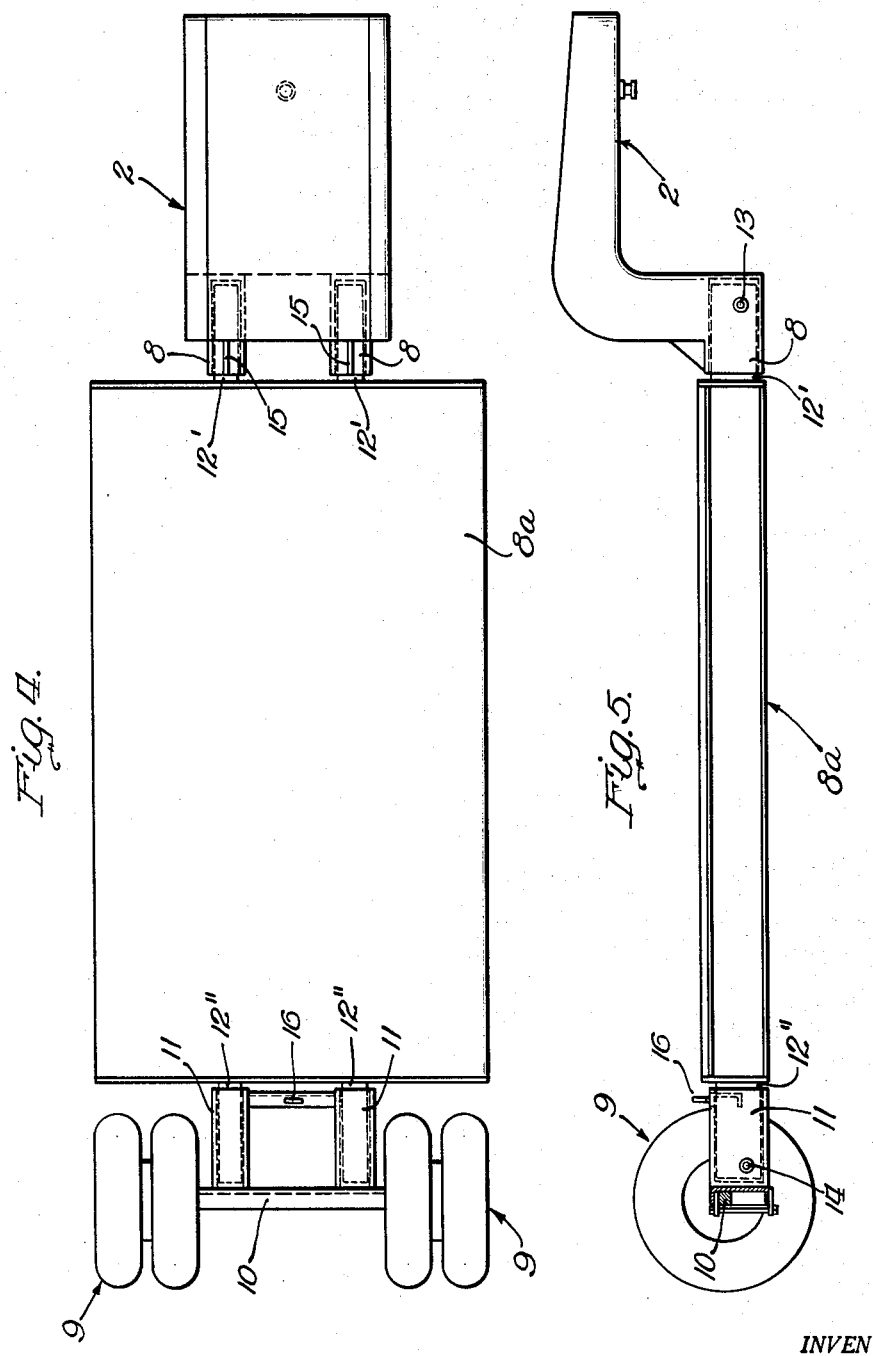
INVENTOR.
William E. Martin
BY
Eberhard E. Wetty
Atty.

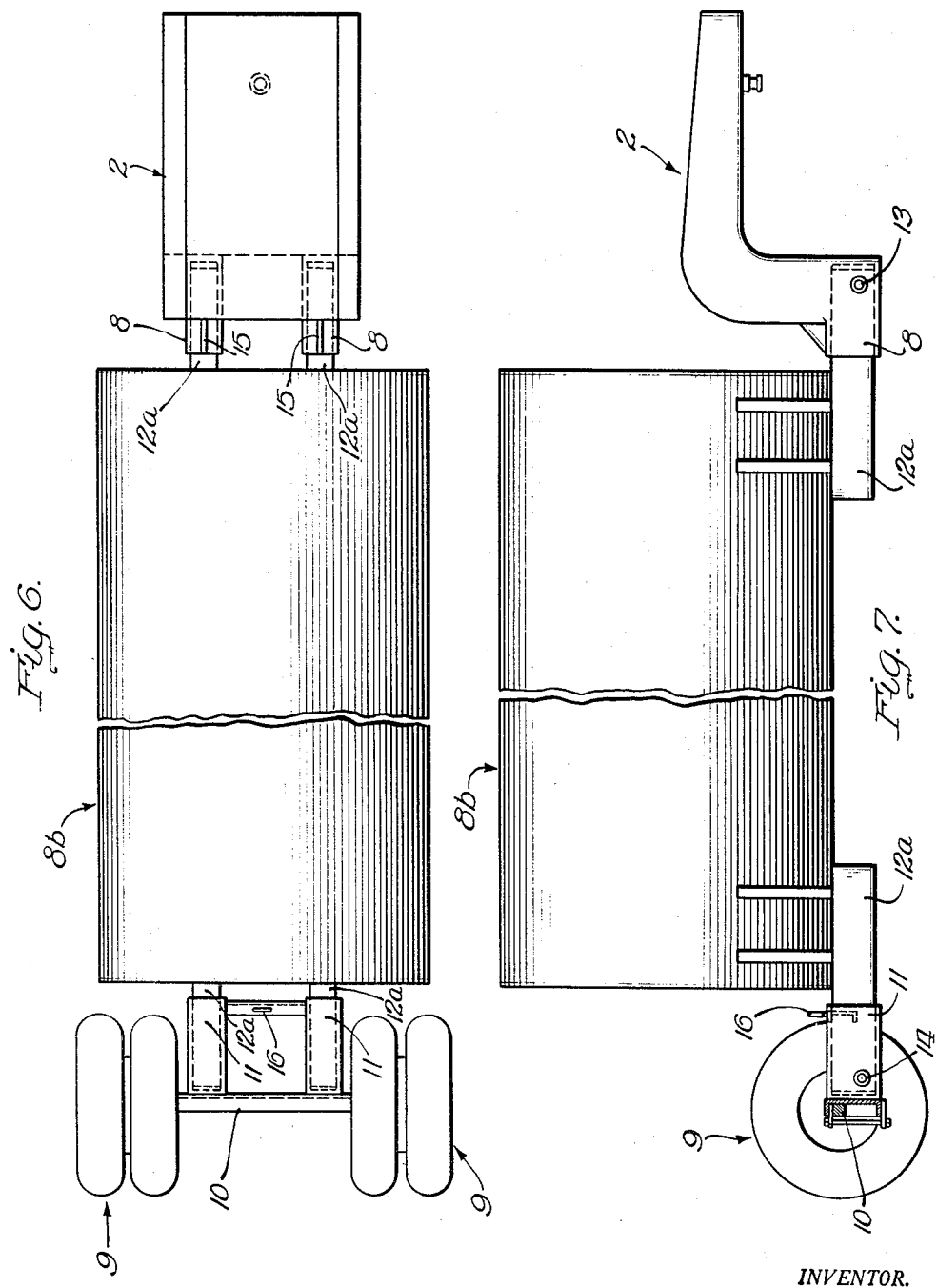

United States Patent Office 2,848,252
Patented Aug. 19, 1958

2,848,252

SEPARABLE COMPOSITE TRAILER CONSTRUCTION

William E. Martin, Kewanee, Ill., assignor, by mesne assignments, to Hyster Company, Portland, Oreg., a corporation of Nevada Original application October 9, 1946, Serial No. 702,249, now Patent No. 2,663,574, dated December 22, 1953. Divided and this application September 15, 1953, Serial No. 380,271

8 Claims. (Cl. 280—415)

The present invention relates to a trailer construction and more particularly to connectible and separable units which, when used in combination, form a trailer. This application comprises a division of my copending application Serial No. 702,249, filed October 9, 1946, now Patent No. 2,663,574, directed to a trailer with detachable gooseneck.

Some of the principal objects of this invention are to provide various connectible units which, when properly chosen and connected, will provide various forms of a convenient transporting unit; to provide structures which may be selected for the particular work to be done and combined to provide an effective structure for the purpose intended; and such further objects, advantages, and capabilities as will hereafter appear and as are inherent in the construction disclosed herein.

This invention further resides in the combination, construction and arrangement of parts illustrated in the accompanying drawings and, while the drawings show therein what may be regarded as several preferred embodiments of this invention, the same are to be understood as illustrative only and are not to be interpreted in a limiting sense.

In the drawings annexed hereto and forming a part thereof,

Fig. 1 represents a side elevational view of the rear end of a traction unit and a gooseneck connected thereto;

Fig. 1A represents a cross-section of a rear supporting unit taken approximately along the plane indicated by the line 1A—1A, Fig. 3A;

Fig. 2 represents the structures of Figs. 1 and 1A connected together by one type of connection;

Figs. 3 and 3A represent plan views of Figs. 1 and 1A;

Figs. 4 and 5 represent, respectively, plan and side elevation of the structure shown in Figs. 1 and 1A, connected by a different type of connecting unit;

Figs. 6 and 7 represent a still further modification of this structure, in which a tank unit is connected between the gooseneck and the rear carrying unit; and Fig. 8 represents, in elevation, still another form of connection of a traction unit to a drawn unit.

Reference will not be made in greater detail to the annexed drawings for a more complete description of this invention. A traction unit is indicated, in general, by the numeral 1 and is shown as being provided with a customary form of fifth wheel connection 2a for receiving the coupling element of a gooseneck 2. Short sections 3 of chain, shown as attached to the traction unit and being connectible to and disconnectible from the gooseneck, serve as means for preventing the gooseneck from swinging sidewise and possibly causing damage when not connected to the rear supporting unit of the trailer. A lever 4 is pivotally connected to the gooseneck at 5 and may be turned about its pivot by the hoist 6, controlled by the handle 7 and a foot 4a is carried by a free end of lever 4 for engagement with a portion of the frame 4b of the tractor 1. One or more units of this kind can be employed with each having a foot 4a and the connected lever 4 that act in the positions shown in Fig. 1 through the hydraulic hoist 6 to support the overhanging gooseneck 2 in a given relation to the tractor frame 4b. Thus, gooseneck 2 is removably carried upon the tractor by the fifth wheel 2a and by one or more feet 4a, and side chains 3 are used as lateral stabilizers to hold the gooseneck 2 in longitudinal alignment with the tractor chassis.

At the rear lower corners of the gooseneck are sockets 8 which serve as connecting means whereby the gooseneck may be connected to another unit, either the wheeled unit of Figs. 1A and 3A, the intermediate spanning or body unit of Figs. 2, 4, 5, 6, and 7, or some other comparable unit provided with spaced projections or frame extensions for insertion into the sockets.

The rear supporting unit of the trailer comprises wheels 9 of desired number, two or four, an axle 10 and connecting means 11. The pairs of means 8 and 11 may be united by a pair of suitable beams 12 which may be either tubular or solid but I prefer to make them tubular and of a size to snugly slip into the parts 8 and 11 and without an undesirable amount of play therein. Suitable securing means such as pins or cross rods 13 and 14 serve to hold the joined parts releasably secured together. A gusset 15 serves to strengthen the joint between the main part of the gooseneck 2 and the connecting means 8. A handle or cable attaching member 16 serves as means whereby the rear connecting unit may be lifted when it is desired to connect this part of the trailer to the forward part comprising the gooseneck 2. Obviously, gooseneck 2 can be held or adjusted by members 4, 4a, 5 and 6 to meet the connecting structures described immediately above. When the gooseneck and wheeled units are connected as in Fig. 2, the hoist 6 can then swing lever 4 into the position here illustrated. Chains 3 are then removed and the trailing vehicle is rendered transportable through gooseneck 2 and fifth wheel 2a as in any other form of trailing vehicle.

If, therefore, it is desired to transport the trailer from one location to another without utilizing it as a transporting medium, it may be connected up as shown in Fig. 2. On the other hand, if it is desired to have a platform on which to load and transport heavy articles, the platform 8a may be connected to the connectors 8 by a pair of units 12′ preferably constructed as parts of the platform 8a, as shown in Fig. 5, and to the connectors 11 by similar units 12″. It will be readily appreciated that this unit, set up as shown in Figs. 4 and 5, can be readily connected to a traction unit, as shown in Figs. 1 and 2, and will serve as a convenient means for transporting loads. Also, the platform is constructed symmetrically with respect to vertical longitudinal and vertical transverse median planes for interchangeability provisions of the vehicle body and attachable units connected by the securing devices and with particular reference in respect to the manner in which they are carried by the platform or body to provide end for end reversal of the latter members with regard to the connectible hitch tongue and wheeled units.

Figs. 6 and 7 show my invention used in the transportation of a large tank 8b which has four units 12a secured thereto in such relationship that they may be inserted into the connectors 8 and 11 for typical gooseneck transportation made feasible by using the detachable gooseneck as illustrated in Figs. 1 and 2.

The modified construction illustrated in Fig. 8 represents a further variation and adaptation of the invention over the forms thereof shown in Figs. 2, 5 and 7. The forward end of a trailer can be arranged for attachment with the connector or reach 20 which replaces the gooseneck structures 2 in Figs. 2, 5 and 7 and which connector 20 connects with the traction unit 1 which is more specifically revised to receive connector 20.

In the Fig. 8 construction, the connector or reach 20 is provided with one or more legs 33 having ground engaging feet 34. A hoist unit such as the hydraulic cylinder 38 is link connected with leg 33 to actuate the leg about its pivotal mounting on the connector unit as brought about through the manipulation of a fluid pump such as 37 carried upon the connector 20 and operably connected with cylinder 38.

The forward connector unit 20 of the trailer is provided with the vertically arranged eye 40 for attachment with the tractor or towing unit 1. The tractor in this instance is constructed and arranged to accommodate unit 20 and provides a body or bracket 25 having a spindle 24 projecting therefrom. The body or bracket 25 is also provided with ears 26 for connection to the eye 40 by means of a pin 22. The spindle 24 is surrounded by a sleeve 41 which has an apertured lug projecting upwardly therefrom for reception between a pair of ears 42. The lug and ears are connected by a pivot pin 43 which allows vertical pivoting action between the traction unit and the trailer unit.

Thus connector 20 is vertically adjustable by leg contact with the ground and the traction unit is arranged for convenient reception of this particular type of connector that is attached to a trailing vehicle.

While I have disclosed various uses for this invention, I wish it understood that this disclosure is illustrative only and is not to be interpreted in a limiting sense. Other embodiments of this invention than shown herein are possible within the scope of the annexed claims and it is my intention that they shall be included within these claims.

What I claim is:

1. In a structure of the character indicated, a wheel-supported axle having attaching means connected thereto, a gooseneck provided with hitch means for connecting it to a traction unit, said gooseneck also being provided with attaching means for connecting it to said axle, and joining means for rigidly connecting said two attaching means, said joining means comprising a spanning structure provided at opposite ends with identical attaching means for securement with the first and second mentioned attaching means respectively to form a mobile vehicle.

2. In a structure of the character indicated, a wheel-supported axle having attaching means connected thereto, a gooseneck provided with hitch means for connecting it to a tractor unit, said gooseneck also being provided with attaching means for connecting it to said axle, and joining means for rigidly connecting said two attaching means, said joining means comprising a hollow tubular intervening structure provided at its opposite ends with identical attaching means for securement with the first and second mentioned attaching means respectively to connect the axle and the gooseneck whereby to form a complete mobile vehicle.

3. In a material hauling trailer, in combination, connected separable trailer forming structures comprising at least one intermediate joining body unit, a wheeled supporting unit, and a gooseneck unit having hitch means thereon for connection with a towing vehicle whereby to bodily move said connected separable structures by means of said wheeled supporting unit, and releasable coacting securing mechanisms carried by said body unit and on each of said other units respectively to provide cooperative means for the disconnection and assembly or for selective interchange of said respective trailer forming units, said mechanisms each comprising a coupling beam portion on one adjoining unit having fixed engagement within a receiving cavity portion for said beam portion on the other of the adjoining units to fixedly secure said two units in transportable relation adjacent one another.

4. In a flat bed trailer, in combination, connected separable unitary elements collectively forming said trailer, said elements comprising a trailer body unit symmetrically constructed end for end, a wheeled supporting unit, and a gooseneck unit having hitch means thereon for connection with a towing vehicle whereby to bodily move said connected separable units by means of said wheeled supporting unit, and releasable coacting securing means connected with the opposite ends of said body unit and with each of said other units respectively comprising like means of one kind connected with said body unit ends and like means of a different kind connected with said other units to couple with the body end means respectively whereby said secured separable units may be disconnected and reassembled and/or selectively interchanged end for end to reversibly support said trailer body unit, said body unit comprising the load carrying platform for said flat bed trailer.

5. In a trailer, in combination, separable unitary elements collectively forming the trailer, said elements comprising a trailer body unit constructed symmetrically with respect to vertically positioned longitudinal and transverse median planes, a wheeled supporting unit providing an end for said body unit, and a hitch unit to provide another end for said body unit and having means for towing connection with a pulling vehicle, and coacting releasable connecting structures interposed between opposite ends of said body unit and said other units respectively comprising laterally spaced similar devices fixedly attached and symmetrically arranged at opposite ends of said body unit, said other units each being provided with identical parts to rigidly receive the devices of either end of the body unit to bodily join said adjacent units together for complementary and sole support of the body unit through said devices and coacting parts and whereby said connected units may be taken apart and reassembled or bodily interchanged end for end in relation to said body unit of said trailer.

6. In a trailer, in combination, separable unitary elements collectively forming the trailer, said elements comprising a trailer body unit constructed symmetrically with respect to vertically positioned longitudinal and transverse median planes, a wheeled supporting unit providing an end for said body unit, and a hitch unit to provide another end for said body unit and having means for towing connection with a pulling vehicle, and coacting releasable connecting structures interposed between opposite ends of said body unit and said other units respectively comprising laterally spaced similar devices fixedly attached and symmetrically arranged at opposite ends of said body unit, said other units each being provided with identical parts to rigidly receive the devices of either end of the body unit to bodily join said adjacent units together for complementary and sole support of the body unit through said devices and coacting parts and whereby said connected units may be taken apart and reassembled or bodily interchanged end for end in relation to said body unit of said trailer, and locking means to releasably secure each of said devices within their coactive receiving parts comprising individual members to bodily engage each of said parts and devices respectively, said members of said locking means and the locations of application of said members to said parts and devices being symmetrically provided to accommodate the selected symmetrical interchange of said trailer units.

7. In a material hauling trailer, in combination, connected separable trailer forming structures comprising at least one intermediate joining body unit, a wheeled supporting unit, and a gooseneck unit having hitch means thereon for connection with a towing vehicle whereby to bodily move said connected separable structures by means of said wheeled supporting unit, and releasable coacting securing mechanisms carried by said body unit and on each of said other units respectively to provide cooperative means for the disconnection and assembly for selective interchange of said respective trailer forming units, said mechanisms each comprising a coupling beam portion on one adjoining unit having fixed engagement within a receiving cavity portion for said beam portion on the other of the adjoining units to fixedly secure said two units in transportable relation adjacent one another, said body unit comprising a tank structure of symmetrical end for end construction adapted for free suspension between the other trailer forming units, said tank structure being provided with similar portions of said securing mechanisms at both ends thereof to coact with the corresponding portions of said attaching units and at common levels to offset the location of said tank structure above the attaching units.

8. In a structure of the character indicated, a wheel-supported axle having attaching means connected thereto, a gooseneck provided with hitch means for connecting it to a traction unit, said gooseneck also being provided with attaching means for connecting it to said axle, and joining means for rigidly connecting said two attaching means, said joining means comprising a spanning structure provided at opposite ends with identical attaching means for securement with the first and second mentioned attaching means respectively to form a mobile vehicle, and securing means to lock each set of the first and second coacting attaching means together comprising pin means and apertures in said attaching means to receive said pin means therethrough, said pin means and said apertures being provided in identical matching locations in all of said attaching means to permit interchange of the connected units carrying said attaching means.

References Cited in the file of this patent

UNITED STATES PATENTS

| Number | Name | Date |
|---|---|---|
| 2,223,650 | Weber | Dec. 3, 1940 |
| 2,256,594 | Ingram | Sept. 23, 1941 |
| 2,325,869 | Mosling | Aug. 3, 1943 |
| 2,350,841 | Troche | June 6, 1944 |
| 2,360,901 | Simmons | Oct. 24, 1944 |
| 2,389,211 | Pointer | Nov. 20, 1945 |
| 2,425,948 | Lucien | Aug. 19, 1947 |
| 2,540,859 | Birkin | Feb. 6, 1951 |